No. 848,420. PATENTED MAR. 26, 1907.
C. E. WEHRENBERG.
BALING PRESS.
APPLICATION FILED OCT. 24, 1906.
2 SHEETS—SHEET 1.
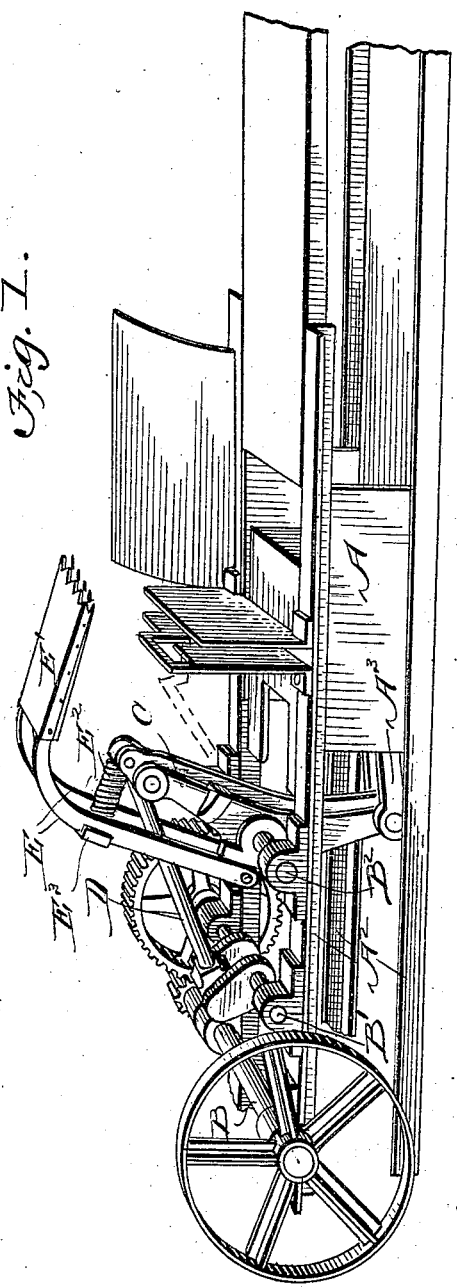
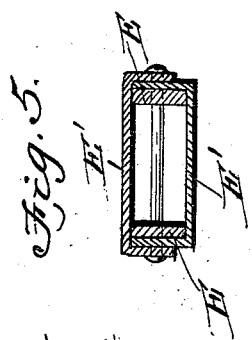
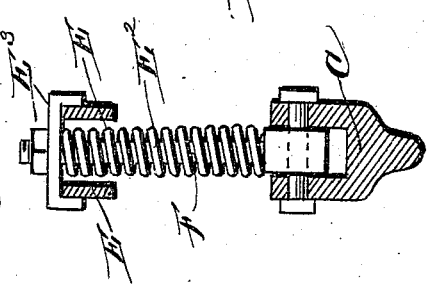
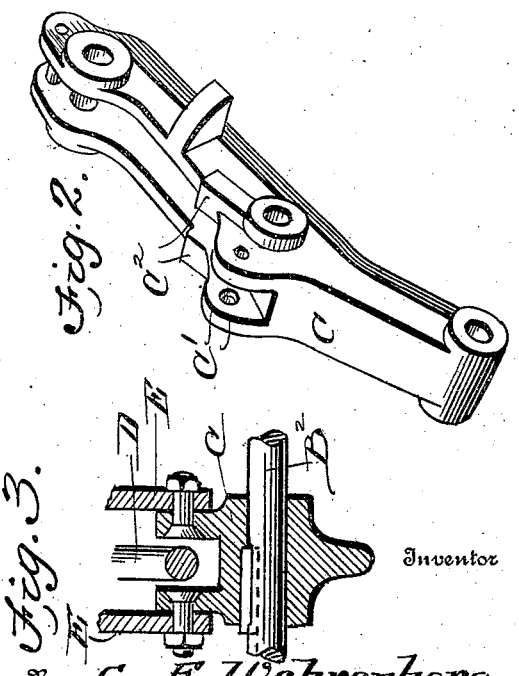
Witnesses
M. Blondel
E. B. McBath
Inventor
C. E. Wehrenberg
By O'Meara & Buck
Attorneys

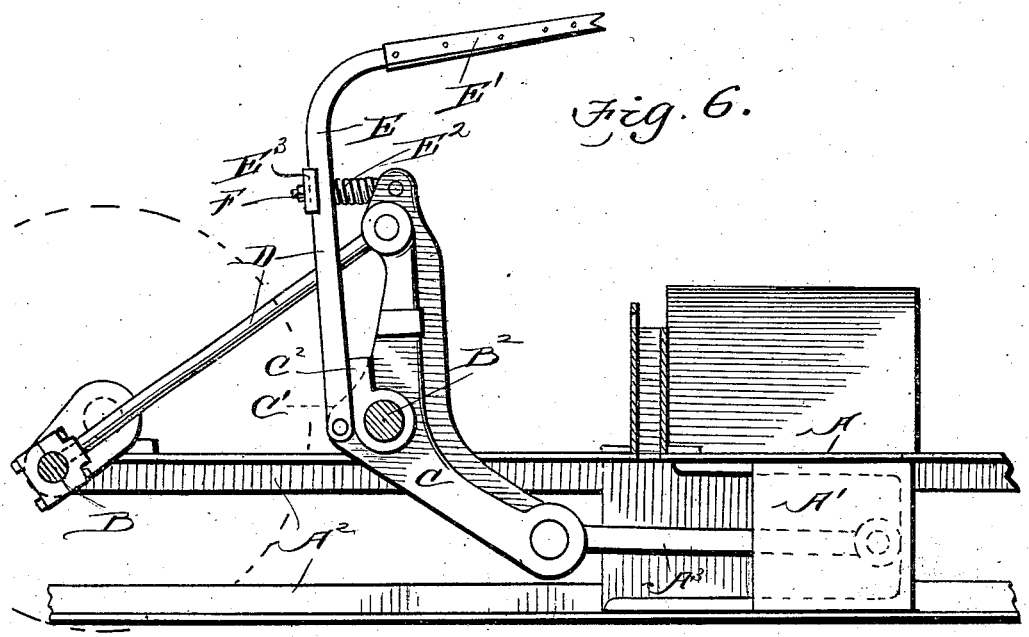
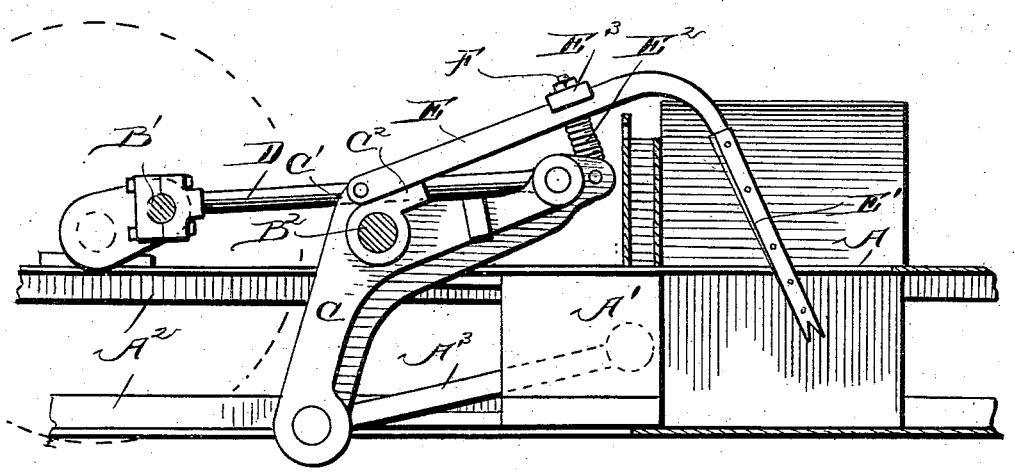

UNITED STATES PATENT OFFICE.

CHARLES E. WEHRENBERG, OF MOUND CITY, ILLINOIS.

BALING-PRESS.

No. 848,420.   Specification of Letters Patent.   Patented March 26, 1907.

Application filed October 24, 1906. Serial No. 340,312.

*To all whom it may concern:*

Be it known that I, CHARLES E. WEHRENBERG, a citizen of the United States, residing at Mound City, in the county of Pulaski and State of Illinois, have invented a new and useful Improvement in Baling-Presses, of which the following is a specification.

This invention relates to a baling-press, and more especially to the form of lever and manner of mounting it and the manner of constructing and mounting the feeder-arm, the object of the invention being, first, the delivery of a slow powerful stroke of the plunger while pressing the hay and a quick return stroke, during which time a new charge is being fed to the baling-chamber, and, secondly, a feeder-arm so arranged that the feeder-foot carried by the arm can reach the bottom of the baling-chamber and feed the hay or other material being handled uniformly, so that a compact and uniform bale will be produced irrespective of the amount of material fed at each step of the baling operation.

In feeders of a solid type an ample clearance must be allowed between the bottom of the chamber and the foot-piece to allow a large charge to remain under the feeder when it is forced down. This results in an uneven bale being produced when small and large charges are fed in alternately. I overcome this objection by providing the feeder-arm with a coil-spring connection which permits it to adjust itself according to the amount of material fed, so that it will always feed evenly, resulting in an even bale being formed.

In the accompanying drawings, Figure 1 is a perspective view of a portion of a press having my improvements applied thereto. Fig. 2 is a detail perspective view of the lever. Fig. 3 is a detail sectional view taken through the lever on the line of its fulcrum-point. Fig. 4 is a detail sectional view taken through the lever and feeder-arm on the line of the spring connection, the spring being shown in elevation. Fig. 5 is a transverse section through the feeder-foot. Fig. 6 is an outline view showing partly in section and partly in elevation the position of the parts at the end of an inward stroke of the plunger. Fig. 7 is a similar view showing the position of the parts at the end of an outward stroke.

In the drawings, A represents a baling-chamber in which is arranged the usual plunger $A'$, and $A^2$ represents portions of the framework of the press. Upon this framework are journaled parallel shafts B, B', and $B^2$. The shaft B' has a crank-shaft, to which is connected one end of a pitman D. A lever C is journaled upon the shaft $B^2$ and is angled, resembling in general outline an irregular bell-crank, and is provided adjacent its fulcrum-point with two parallel ears $C'$, adjacent which are formed two shoulders $C^2$. The feeder-arm E is constructed of two parallel bars, the lower ends of which are pivotally connected to the ears $C'$ and are curved adjacent their free ends, which ends support a foot $E'$. The foot $E'$ is formed of two plates of angled metal $E'$, which are fastened, respectively, to the upper and under edges of the bars constituting the arm E. As these arms taper to a point the plates converge and are provided upon the converging ends with teeth in the ordinary manner. The feeder-arm E is also pivotally connected to the lever C by means of a coil-spring $E^2$, which encircles a bolt F, which bolt is pivoted to the upper end of the lever C and passes through a plate $E^3$, which rests transversely across the arm E, the plate being flanged adjacent each end to engage the sides of the arm. The bolt is secured in place by a suitable nut in the usual manner. The spring $E^2$ is secured at its lower end to the bolt F and at its upper end to the plate $E^3$. The tendency of this spring is to pull the feeder-arm toward the upper end of the lever C, the plate $E^3$ sliding loosely upon the bolt F. By adjusting the nut the tension of the spring can be regulated so that when by reason of an unusually large charge the feeder-arm approaches the outer end of the lever C sufficiently to compress the spring $E^2$ the spring will when the pressure is released return the feeder-arm to its normal position, as determined by the adjustment of the nut.

It will be noted from the drawings, and especially from Figs. 6 and 7, that a straight line drawn from the pivotal points between the lever C and the pitman D and the lever C and plunger-rod $A^3$, to which the lower end of the lever is pivoted, will be considerably to one side of the fulcrum-point of the lever, which point is the shaft $B^2$, this being due to the angling of the lever. This construction results in the pitman-rod D approaching the fulcrum-point as the plunger $A'$ moves downwardly and moving gradually from said point as the inward stroke commences, reaching its furthest position with respect to the shaft B² as the plunger A' finishes its inward stroke, thus giving the greatest pressure as the material becomes more closely packed and a slow movement under a high pressure is desired.

Having thus described my invention, what I claim as new, and desire to secure by Letters Patent, is—

1. The combination with a baling-press, said press having a baling-chamber, a plunger, and a plunger-rod, of a lever pivoted intermediate its ends, the said lever angled, the lower end of the lever being pivotally connected to the plunger-rod, a pitman pivotally connected to the upper end of the lever, a feeder-arm pivotally mounted upon said lever adjacent the central pivot-point of the lever, and a coil-spring connecting the said feeder-arm and the upper end of the lever.

2. In a baling-press, a baling-chamber, a plunger, a shaft, an angled lever mounted on the shaft, a pitman-rod pivotally connected to one end of the lever, a plunger-rod pivotally connected to the other end of the rod, a feeder-arm provided with a feeder-foot, said feeder-arm being pivotally connected to the lever adjacent the shaft, a bolt pivotally connected to an end portion of the lever adjacent the pitman, a plate adapted to engage the feeder-arm, the bolt working loosely through the plate, and a coil-spring connected at one end to the bolt and at the opposite end to the plate, as and for the purpose set forth.

CHARLES E. WEHRENBERG.

Witnesses:
M. F. MURPHY,
GEO. MARTIN.